United States Patent
Lee et al.

(10) Patent No.: US 10,644,285 B2
(45) Date of Patent: May 5, 2020

(54) SECONDARY BATTERY

(71) Applicant: LG Chem, Ltd., Seoul (KR)

(72) Inventors: Kwan Soo Lee, Daejeon (KR); Duk Hyun Ryu, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/747,640

(22) PCT Filed: Jun. 14, 2016

(86) PCT No.: PCT/KR2016/006310
§ 371 (c)(1),
(2) Date: Jan. 25, 2018

(87) PCT Pub. No.: WO2017/119556
PCT Pub. Date: Jul. 13, 2017

(65) Prior Publication Data
US 2018/0219199 A1    Aug. 2, 2018

(30) Foreign Application Priority Data

Jan. 7, 2016 (KR) ........................ 10-2016-0002045

(51) Int. Cl.
*H01M 2/12* (2006.01)
*H01M 2/26* (2006.01)
(Continued)

(52) U.S. Cl.
CPC ....... *H01M 2/1223* (2013.01); *H01M 2/1241* (2013.01); *H01M 2/26* (2013.01);
(Continued)

(58) Field of Classification Search
None
See application file for complete search history.

(56) References Cited

U.S. PATENT DOCUMENTS

| | | |
|---|---|---|
| 2004/0241536 A1 | 12/2004 | Kim |
| 2005/0112462 A1 | 5/2005 | Marple |

(Continued)

FOREIGN PATENT DOCUMENTS

| | | |
|---|---|---|
| CN | 1574440 A | 2/2005 |
| CN | 102376974 A | 3/2012 |

(Continued)

OTHER PUBLICATIONS

Search report from International Application No. PCT/KR2016/006310, dated Oct. 5, 2016.

(Continued)

*Primary Examiner* — Brian R Ohara
(74) *Attorney, Agent, or Firm* — Lerner, David, Littenberg, Krumholz & Mentlik, LLP

(57) ABSTRACT

The present invention relates to a secondary battery that is capable of preventing corrosion within the battery from occurring. Also, the secondary battery according to the present invention includes an electrode assembly provided with an electrode tab, a can member accommodating the electrode assembly and comprising a vent part for discharging a gas when internal pressure increases, and a protection member preventing the electrode tab and the vent part from coming into contact with each other.

4 Claims, 3 Drawing Sheets

(51) Int. Cl.
*H01M 2/34* (2006.01)
*H01M 10/04* (2006.01)
*H01M 10/0525* (2010.01)
*H01M 10/058* (2010.01)
*H01M 10/0587* (2010.01)

(52) U.S. Cl.
CPC ............. *H01M 2/34* (2013.01); *H01M 10/04* (2013.01); *H01M 10/0422* (2013.01); *H01M 10/0431* (2013.01); *H01M 10/058* (2013.01); *H01M 10/0525* (2013.01); *H01M 10/0587* (2013.01); *Y02E 60/122* (2013.01); *Y02T 10/7011* (2013.01)

(56) References Cited

U.S. PATENT DOCUMENTS

| | | | |
|---|---|---|---|
| 2009/0214938 A1* | 8/2009 | Yamamoto | H01M 4/364 429/94 |
| 2010/0255364 A1 | 10/2010 | Hyung | |
| 2012/0034513 A1* | 2/2012 | Kim | H01M 2/0275 429/186 |
| 2013/0122336 A1 | 5/2013 | Park et al. | |
| 2014/0072841 A1* | 3/2014 | Yamada | H01M 2/0404 429/53 |
| 2015/0236334 A1* | 8/2015 | Lee | H01M 2/1205 429/82 |

FOREIGN PATENT DOCUMENTS

| | | |
|---|---|---|
| EP | 1685612 A2 | 8/2006 |
| EP | 2416406 A1 | 2/2012 |
| JP | 4073378 B2 | 4/2008 |
| KR | 1997054691 A | 7/1997 |
| KR | 100686859 B1 | 2/2007 |
| KR | 20090026419 A | 3/2009 |
| KR | 20100110723 A | 10/2010 |
| KR | 20120013877 A | 2/2012 |
| KR | 20130053102 A | 5/2013 |
| KR | 101308206 B1 | 9/2013 |
| KR | 20150034564 A | 4/2015 |

OTHER PUBLICATIONS

Extended European Search Report including Written Opinion for Application No. EP16883942.1 dated Jan. 2, 2019.

Search Report for Chinese Application No. 201680047362.3 from Office Action dated Nov. 4, 2019.

* cited by examiner

SECONDARY BATTERY

CROSS-REFERENCE TO RELATED APPLICATIONS

The present application is a national phase entry under 35 U.S.C. § 371 of International Application No. PCT/KR2016/006310 filed on Jun. 14, 2016, which claims priority from Korean Patent Application No. 10-2016-0002045, filed on Jan. 7, 2016, in the Republic of Korea, the disclosures of which are incorporated by reference herein in their entirety.

TECHNICAL FIELD

The present invention relates to a secondary battery, and more particularly, to a secondary battery that is capable of preventing corrosion within the battery from occurring.

BACKGROUND ART

Batteries (cells) that generate electric power through physical or chemical reaction to supply the generated power to the outside are used when AC power to be supplied to the building is not obtained, or DC power is required according to the living environments surrounded by various electric and electronic devices.

Among such batteries, primary batteries and secondary batteries, which are chemical batteries using chemical reaction, are generally used. The primary batteries are consumable cells which are collectively referred to as dry cells. Also, secondary batteries are rechargeable batteries that are manufactured by using a material in a redox process between current and a substance is repeatable several times. When the reduction reaction is performed on the material by the current, power is charged, and when the oxidation reaction is performed on the material, power is discharged. Such the charging-discharging is repeatedly performed to generate electricity.

A lithium ion battery of the secondary batteries is manufactured through the following processes. An active material is applied to each of a positive electrode conductive foil and a negative electrode conductive foil at a predetermined thickness, and a separator is disposed between the positive electrode conductive foil and the negative electrode conductive foil, and then, an electrode assembly, in which the positive electrode conductive foil, the separator, and the negative electrode conductive foil are wound several times in a jelly-roll or cylindrical shape, is accommodated into a cylindrical or prismatic can, a pouch, and the like to seal the resultant product, thereby manufacturing the lithium ion battery.

A case of a lithium ion battery according to the related art is disclosed in Korean Patent Publication No. 10-1997-0054691.

The case of the lithium ion battery according to the related art includes a vent in a bottom surface of a can to discharge a gas when an internal pressure increases.

However, a pre-plated nickel (Ni) layer of the can may be damaged by punching that is introduced for forming the vent.

Also, when a negative electrode tab is welded, a portion of the tab may be bent. Also, when the bent tab comes into contact with the vent, the nickel layer may be additionally lost to accelerate corrosion within the can due to the resistance current applied during the welding.

DISCLOSURE OF THE INVENTION

Technical Problem

Therefore, the present invention has been made to solve the abovementioned limitations, and an object of the prevent invention is to provide a secondary battery that is capable of preventing a tab member of an electrode assembly from coming into contact with a vent part of a can member.

Technical Solution

A secondary battery according to the present invention includes an electrode assembly provided with an electrode tab, a can member accommodating the electrode assembly and comprising a vent part for discharging a gas when an internal pressure increases, and a protection member preventing the electrode tab and the vent part from coming into contact with each other.

The protection member may be attached to the electrode tab.

The protection member may include at least one adhesion film made of polypropylene (PP), polyimide (PI), or polyester (PET).

The protection member may have a thickness of 3 um to 50 um.

The protection member may be attached to a width of 2 mm to 7 mm of the electrode tab.

The electrode tab may include a negative electrode tab.

Advantageous Effects

According to the present invention, the contact between the electrode tab and the vent part may be blocked to prevent the corrosion within the can member from occurring.

Also, according to the present invention, since the contact between the electrode tab and the vent part is blocked only by attaching the adhesion film having the insulation, it is easy to manufacture.

MODE FOR CARRYING OUT THE INVENTION

Figure 1:
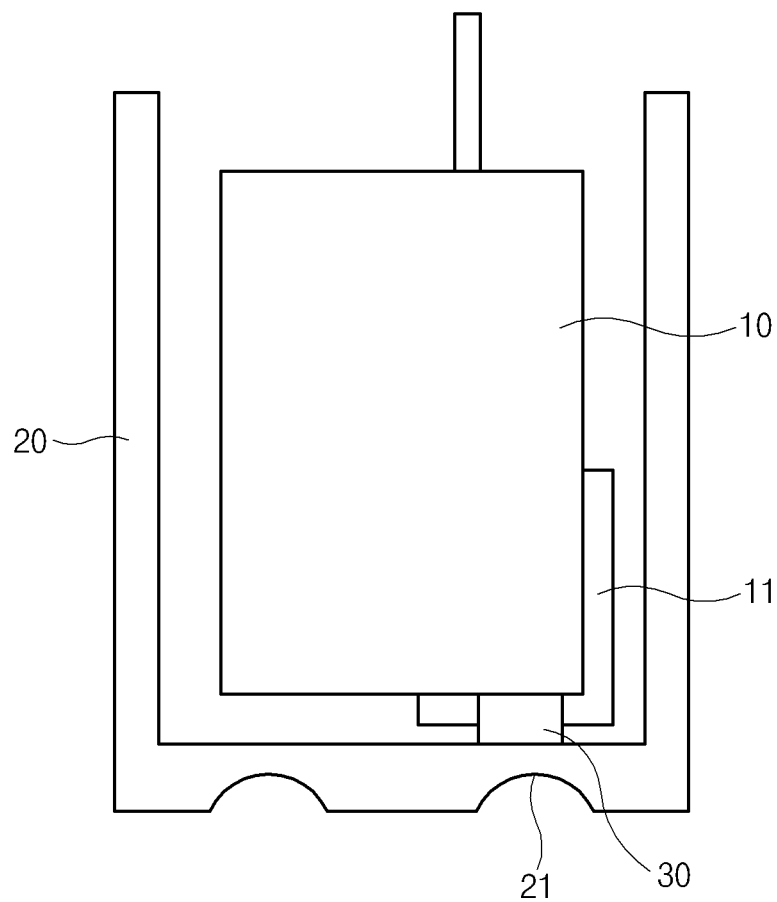
FIG. 1 is a schematic view illustrating a configuration of a main part of a secondary battery according to an embodiment of the present invention.

Hereinafter, a secondary battery according to a preferred embodiment will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

FIG. 1 is a schematic view illustrating a configuration of a main part of a secondary battery according to an embodiment of the present invention.

As illustrated in FIG. 1, a secondary battery according to an embodiment of the present invention includes an electrode assembly 10 on which an electrode tab 11 is disposed, a can member 20 accommodating the electrode assembly 10 and including a vent part 21 for discharging a gas when an internal pressure increases, and a protection member 30 preventing the electrode tab 11 and the vent part 21 from coming into contact with each other.

The electrode assembly 10 includes a positive electrode having both surfaces coated with a positive electrode active material, a negative electrode having both surfaces coated with a negative electrode active material, and a separator disposed between the positive electrode and the negative electrode to prevent the positive electrode and the negative electrode from being short-circuited and allowing only lithium ions to be movable.

Also, in case of a cylindrical type secondary battery, the electrode assembly 10 is wound in an approximately circular shape and accommodated into the cylindrical can member 20.

The can member 20 may be made of aluminum (Al), iron (Fe), or an alloy thereof, but the can member 20 according to the present invention is not limited to the above-described materials.

A chalcogenide compound is used as the positive electrode active material. Exemplary examples of the chalcogenide compound include composite metal oxides such as $LiCoO_2$, $LiMn_2O_4$, $LiNiO_2$, $LiNi_{1-x}Co_xO_2(0<x<1)$, and $LiMnO_2$.

Exemplary examples of the negative electrode active material include carbon (C)-based materials, silicon (Si), tin (Sn), tin oxides, composite tin alloys, transition metal oxides, lithium metal nitrides, or lithium metal oxides.

Also, generally, the positive electrode is made of an aluminum (Al) material, and the negative electrode is made of a copper (Cu) material. For example, the separator may be manufactured by applying a polyvinylidene fluoride-hexafluoropropylene copolymer (PVDF-HFP co-polymer) to one material selected from the group consisting of polyethylene (PE), polystyrene (PS), polypropylene (PP), and a co-polymer of polyethylene (PE) and polypropylene (PP), but the present invention is not limited to the above materials.

Also, the positive electrode may be made of an aluminum (Al) material, and a non-coating portion that is not coated with the active material is formed on an end of at least one surface of both surfaces of the positive electrode.

Also, the negative electrode may be made of a copper (Cu) material, and a non-coating portion that is not coated with the active material is formed on an end of at least one surface of both surfaces of the negative electrode.

Also, the electrode tab 11 is attached to the non-coating portion of each of the positive electrode and the negative electrode and electrically connected to the outside of the electrode assembly 10. The electrode tab 11 attached to the non-coating portion of the positive electrode may be a positive electrode tab, and the electrode tab 11 attached to the non-coating portion of the negative electrode may be a negative electrode tab.

In the present invention, the electrode tab 11 may be one of the positive electrode tab and the negative electrode tab. Hereinafter, the negative electrode tab will be described as one example.

Figure 2:
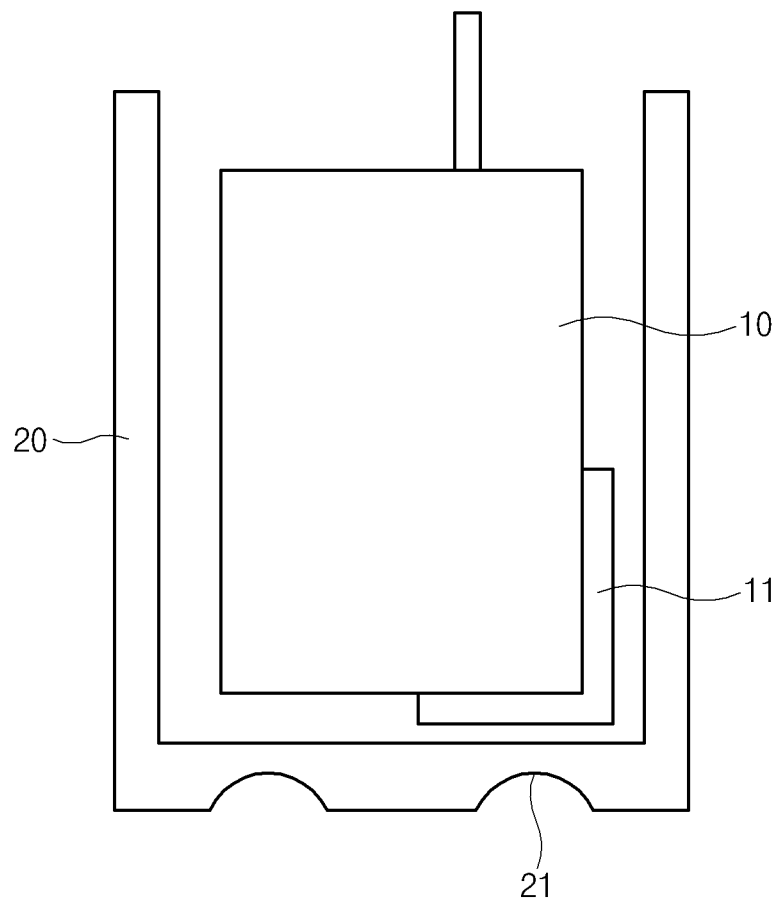
FIG. 2 is a view illustrating a state in which an electrode tab and a vent part of the secondary battery come into contact with each other.

FIG. 2 is a view illustrating a state in which the electrode tab and the vent part of the secondary battery come into contact with each other.

As illustrated in FIG. 2, the can member 20 of a cylindrical type battery and a prismatic type battery comes to the force in safety enhancement due to the expansion of the application of electric vehicles. To prevent an explosion effect from expanding to the surroundings when the battery is exploded, the vent part 21 is provided in a bottom portion of the can member 20.

The vent part 21 is formed to be thinner than other portions of the bottom portion of the can member 20 so that a gas generated in the can member 20 is discharged to the outside while being cut when an internal pressure of the can member 20 increases.

However, while the bottom portion of the can member 20 is punched to form the vent part 21, a pre-plated nickel (Ni) layer of the can member 20 is lost.

Also, the negative electrode tab of the electrode tabs 11 of the electrode assembly 10 is disposed on the bottom portion of the can member 20 to come into contact with the vent part 21. Thus, while the negative electrode tab is welded to the can member 20, the nickel (Ni) layer may be additionally lost by the vent part 21 due to resistance current applied during the welding to accelerate corrosion within the can member 20.

Thus, according to the present invention, to prevent the corrosion within the can member 20 from occurring, the protection member 30 is attached to the negative electrode tab to prevent the negative electrode tab from coming into contact with the vent part 21.

Figure 3:
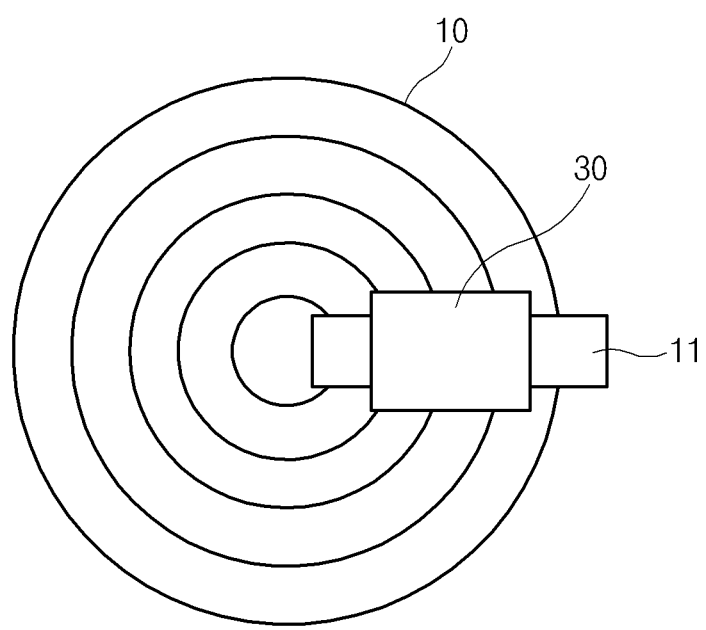
FIG. 3 is a schematic rear view illustrating a state in which a protection member is attached to the electrode tab according to an embodiment of the present invention.

FIG. 3 is a schematic rear view illustrating a state in which the protection member is attached to the electrode tab according to an embodiment of the present invention.

As illustrated in FIG. 3, the protection member 30 may be provided as at least one adhesion film made of polypropylene (PP), polyimide (PI), polyester (PET), or the like, which have excellent insulation and heat resistance and be attached to the negative electrode tab.

Particularly, it is preferable that the protection member 30 is attached to a width of 2 mm to 7 mm of the negative electrode tab so as to adhere to the surface of the negative electrode tab, which comes into contact with the vent part 21.

Also, it is preferable that the protection member 30 has a thickness of 3 um to 50 um so that the thickness of the protection member 30 does not affect a size of the battery.

As described above, in the secondary battery according to the present invention, the contact between the electrode tab and the vent part may be blocked to prevent the corrosion within the can member from occurring.

Also, according to the present invention, since the contact between the electrode tab and the vent part is blocked only by attaching the adhesion film having the insulation, it is easy to manufacture.

Although the secondary battery according to the present invention has been described above with reference to the exemplary drawings, various changes and modifications may be made thereto by one skilled in the art without departing from the scope and spirit of the invention as set forth in the appended claims.

The invention claimed is:

1. A secondary battery comprising:

an electrode assembly provided with an electrode tab;

a can member accommodating the electrode assembly and comprising a vent part for discharging a gas when an internal pressure increases, the can member having a top opening and a circular bottom portion opposite the top opening, the bottom portion having a nickel layer plated onto an inner surface thereof, the can member having a cylindrical side wall extending away from the bottom portion and extending circumferentially around the electrode assembly, the vent part being an area of the bottom portion that is thinner than a remainder of the bottom portion, a portion of the nickel layer being absent at the vent part of the bottom portion, the electrode tab being directly attached to the bottom portion at the remainder of the bottom portion and not directly attached to the vent part; and a protection member attached to the electrode tab only along a portion of the electrode tab that has a length between 2 mm and 7 mm, the protection member preventing the electrode tab and the vent part from coming into contact with each other, the protection member extending between the electrode tab and the vent part at the portion of the nickel layer that is absent, the protection member having a first surface directly attached to the electrode tab and having a second surface opposite the first surface that is directly attached to the vent part.

2. The secondary battery of claim 1, wherein the protection member comprises at least one adhesion film made of polypropylene (PP), polyimide (PI), or polyester (PET).

3. The secondary battery of claim 1, wherein the protection member has a thickness of 3 um to 50 um.

4. The secondary battery of claim 1, wherein the electrode tab comprises a negative electrode tab.

* * * * *